(12) United States Patent
Rao et al.

(10) Patent No.: US 11,197,028 B2
(45) Date of Patent: Dec. 7, 2021

(54) RECOVERY DURING VIDEO ENCODING

(71) Applicant: SLING MEDIA PVT LTD, Bengaluru (IN)

(72) Inventors: R V K S Narayana Rao, Bangalore (IN); Gajanan Hegde, Karnataka (IN); Dalimba Laxminarayana, Bangalore (IN); Satish Iyer, Bangalore (IN); Vivek Maran, Bangalore (IN); Vivek Devaraj, Bangalore (IN)

(73) Assignee: SLING MEDIA PVT LTD, Bengaluru (IN)

(*) Notice: Subject to any disclaimer, the term of this patent is extended or adjusted under 35 U.S.C. 154(b) by 0 days.

(21) Appl. No.: 15/920,338

(22) Filed: Mar. 13, 2018

(65) Prior Publication Data

US 2018/0262779 A1  Sep. 13, 2018

(30) Foreign Application Priority Data

Mar. 13, 2017  (IN) .............................. 201741008645

(51) Int. Cl.
*H04N 19/46* (2014.01)
*H04N 19/423* (2014.01)
(Continued)

(52) U.S. Cl.
CPC ........... *H04N 19/65* (2014.11); *H04N 19/423* (2014.11); *H04N 19/46* (2014.11); *H04N 19/85* (2014.11);
(Continued)

(58) Field of Classification Search
CPC ...... H04N 19/46; H04N 19/65; H04N 19/127; H04N 19/156; H04N 19/169; H04N 19/423; H04N 19/85
(Continued)

(56) References Cited

U.S. PATENT DOCUMENTS 8,838,911 B1 * 9/2014 Hubin ...................... H04N 5/76
711/147
9,942,578 B1 * 4/2018 Vantalon ............. H04N 21/262
(Continued)

FOREIGN PATENT DOCUMENTS

CN  104063447 A * 9/2014
JP  2011234068 A * 11/2011
(Continued)

OTHER PUBLICATIONS

European Patent Office International Searching Authority, International Search Report and Written Opinion for International Application No. PCT/IB2018/051638 dated May 17, 2018.

*Primary Examiner* — Christopher S Kelley
*Assistant Examiner* — Kathleen M Walsh
(74) *Attorney, Agent, or Firm* — Lorenz & Kopf, LLP

(57) ABSTRACT

Systems, devices and automated processes reduce the effects of unwanted interruption during video encoding by reserving header space at the outset of video encoding. This reserved space can be progressively filled on any periodic or other basis as encoding continues so that a recent header is always available. If an interruption occurs, only the video content encoded after the last header write will be lost, thereby greatly reducing the effects of the interruption.

17 Claims, 3 Drawing Sheets

(51) Int. Cl.
  *H04N 19/65* (2014.01)
  *H04N 19/85* (2014.01)
  *H04N 19/127* (2014.01)
  *H04N 19/156* (2014.01)
  *H04N 19/169* (2014.01)

(52) U.S. Cl.
  CPC .......... *H04N 19/127* (2014.11); *H04N 19/156* (2014.11); *H04N 19/169* (2014.11)

(58) Field of Classification Search
  USPC .................................................... 375/240.27
  See application file for complete search history.

(56) References Cited

U.S. PATENT DOCUMENTS

| | | | | |
|---|---|---|---|---|
| 2004/0028042 A1* | 2/2004 | Srinivasan | ............ | G11B 27/28 370/392 |
| 2004/0076046 A1* | 4/2004 | Brucklmayr | ......... | G11C 16/102 365/200 |
| 2006/0098960 A1* | 5/2006 | Okayama | ............ | G11B 27/105 386/232 |
| 2006/0126948 A1* | 6/2006 | Fukuhara | ............... | H04N 19/63 382/232 |
| 2007/0076799 A1* | 4/2007 | Wan | ........................ | H04N 19/44 375/240.25 |
| 2007/0183756 A1* | 8/2007 | Vaughan | ............ | H04N 21/2662 386/211 |
| 2009/0163137 A1* | 6/2009 | Capparelli | ............. | H04H 60/07 455/3.06 |
| 2009/0204837 A1* | 8/2009 | Raval | .................... | G06F 1/3203 713/330 |
| 2011/0022400 A1* | 1/2011 | Kimura | ................. | G10L 19/167 704/500 |
| 2011/0208933 A1* | 8/2011 | Selfin | ................. | G06F 11/1441 711/162 |
| 2011/0228716 A1* | 9/2011 | Xue | .................... | H04N 21/6175 370/312 |
| 2012/0054370 A1* | 3/2012 | Tsubakihara | .......... | G06F 16/164 709/246 |
| 2013/0254611 A1* | 9/2013 | Amerga | ............. | G06F 11/1402 714/746 |
| 2014/0280400 A1* | 9/2014 | Legay | ................. | H04N 21/231 707/827 |
| 2015/0088899 A1* | 3/2015 | Hoffert | ............... | G06F 16/2228 707/741 |
| 2015/0110202 A1* | 4/2015 | Tucker | ................... | H04N 19/85 375/240.26 |
| 2015/0208053 A1* | 7/2015 | Hubin | .................... | H04N 5/765 386/248 |
| 2015/0215358 A1* | 7/2015 | Wang | ................. | H04N 21/8456 709/231 |
| 2016/0080456 A1* | 3/2016 | Ma | .......................... | H04L 65/80 709/231 |
| 2016/0247537 A1* | 8/2016 | Ricciardi | ............. | G11B 27/036 |
| 2018/0077421 A1* | 3/2018 | Sablin | ................. | H04N 19/895 |

FOREIGN PATENT DOCUMENTS

| | | |
|---|---|---|
| WO | 2010049929 A1 | 5/2010 |
| WO | 2014006375 A1 | 1/2014 |

* cited by examiner

RECOVERY DURING VIDEO ENCODING

PRIORITY CLAIM

This application claims priority to India Provisional Patent Application Serial No. 201741008645, which was filed on 13 Mar. 2017.

TECHNICAL FIELD

The following discussion generally relates to digital encoding of video content, especially live video content. More particularly, the following discussion relates to recovery from technical faults that could interrupt video encoding.

BACKGROUND

Recent years have seen an explosion in the creation and enjoyment of digital video content. Millions of people around the world now carry mobile phones, cameras or other devices that are capable of capturing high quality video and/or of playing back video streams in a convenient manner. Moreover, Internet sites such as YOUTUBE have provided convenient and economical sharing of live-captured video, thereby leading to an even greater demand for live video content.

Occasionally, interruptions can occur while a video is being encoded for storage or distribution. Interruptions in video encoding could be caused by any number of different factors, such as loss of electrical power, loss of connectivity to a camera or other live video capture device, accidental disconnection or removal of a memory card or other physical storage, human errors and/or any number of other events. With conventional video encoding, these interruptions to the encoding process can result in corruption of the encoded content; if the corruption cannot be repaired, the content could be lost, often to the great disappointment of the user.

It is therefore desirable to create systems and methods that are able to improve recovery after unwanted interruptions in video encoding and/or to otherwise reduce the effects of such interruptions. Other desirable features and characteristics will become apparent from the subsequent detailed description and the appended claims, taken in conjunction with the accompanying drawings and this background section.

BRIEF SUMMARY

Various embodiments provide systems, devices and processes to reduce the effects of unwanted interruption during video encoding. As described more fully below, header space can be reserved at the outset of video encoding. This reserved space can be progressively filled on any periodic or other basis as encoding continues so that a recent header is always available. If an interruption occurs, only the video content encoded after the last header write will be lost, thereby greatly reducing the effects of the interruption.

One embodiment provides an automated process executed by a video encoder device to encode digital video content to a file. The automated process suitably comprises: prior to encoding the digital video content, the video encoder device reserving an initial portion of the file as header space for storing header information about the encoded digital video content; encoding a portion of the digital video content by the video encoder device; after encoding a portion of the digital video content, the video encoder device storing the encoded digital video content in a data portion of the file that occurs after the header space, and also storing intermittent header information describing the encoded portion of the digital video content in the previously-reserved header space; and repeating the encoding and the storing of intermittent header information by the video encoder device until either the encoding of the digital video content is complete, or until the previously-reserved header space is filled.

Another example embodiment provides a a video encoder device comprising a processor and a memory, wherein the memory stores instructions that are executable by the processor to perform an automated process that encodes digital video content to a file. The automated process suitably comprises: reserving a portion of the file as header space for storing header information about the encoded digital video content prior to encoding the digital video content; encoding a portion of the digital video content; after encoding a portion of the digital video content, storing the encoded digital video content in a data portion of the file that occurs after the header space, and also storing intermittent header information describing the encoded portion of the digital video content in the previously-reserved header space; and repeating the encoding and the storing of intermittent header information until either the encoding of the digital video content is complete, or until the previously-reserved header space is filled.

The automated processes could further comprise recovering the file after an interruption that occurred during the encoding by reading the intermittent header information that was last stored in the header space prior to the interruption.

In some examples, the file is formatted as an MPEG container, wherein the header space is formatted as a moov box and wherein the data portion is formatted as an mdat box. Other embodiments could apply to different video encoding formats and/or data storage formats, as desired.

Various additional examples, aspects and other features are described in more detail below.

BRIEF DESCRIPTION OF THE DRAWING FIGURES

Several example embodiments are hereinafter described in conjunction with the following drawing figures, wherein like numerals denote like elements, and:

DETAILED DESCRIPTION

Figure 1:
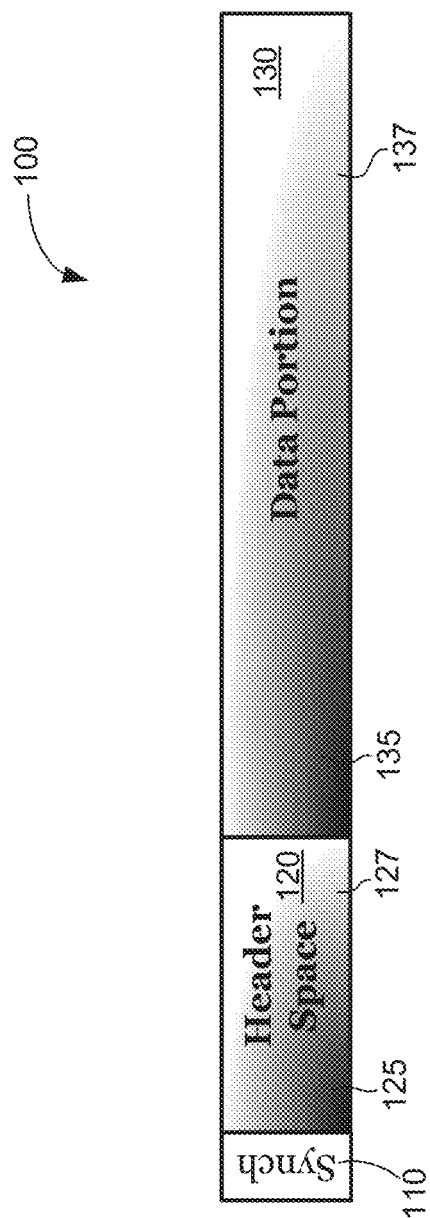
FIG. 1 is a diagram of an example format for a live encoded video stream.

The following detailed description of the invention is intended to provide various examples, but it is not intended to limit the invention or the application and uses of the invention. Furthermore, there is no intention to be bound by any theory presented in the preceding background or the following detailed description.

As noted above, various embodiments are able to mitigate the effects of power loss, memory card removal or other interruptions by initially reserving a header space in the encoded content file, and then by periodically (or otherwise) producing a new header that can be placed into the reserved space while encoding continues. If an interruption does occur during encoding, the file should still be usable at least up until the time that the previous header was created and stored, thereby preserving the bulk of the encoded video content. Various embodiments may be augmented or modified as desired, and many equivalent embodiments are described herein.

In conventional MPEG4 video encoding, the encoded content is not able to be played back until the entire file is completely encoded and the index data is finalized. Finalization typically involves writing an index or the like that identifies locations of the various video frames and other portions of the encoded data so that the media player can locate appropriate data for playback, trick play, etc.

Traditionally, the index file has been placed at the end of the file so as not to disrupt the previously-encoded video data. Placing the index at the end of the file, however, typically requires that the entire video file to be downloaded before playback can begin, thereby leading to unwanted delay. More recently, MPEG "fast start" techniques have been used to instead store the index data at the beginning of the file, thereby allowing for faster playback. These fast start techniques, however, still wait for the entire file to be encoded before the index is written into the file header. Even if the index data is eventually written to the beginning of the file, the entire data file can still become unreadable if the encoding process is interrupted for any reason prior to finalization of the encoded file.

To prevent data loss or corruption due to interruptions, the header data can be intermittently formatted and stored in a reserved header space (e.g., space at the beginning of the encoded video file) while the video encoding continues. Header creation and storage may occur according to any regular or irregular temporal basis, for example, so that a valid index is maintained for the majority of the encoded content even if an interruption were to occur. If the header is written every sixty seconds, for example, an interruption could only corrupt a minute's worth of data. The encoding that occurred prior to the most recent header, however, would still be valid and readable according to the stored index data, thereby greatly reducing the amount of lost or corrupted data.

The general concepts described herein may be implemented in any video encoding context, especially the encoding or transcoding of live captured video. For convenience of illustration, the following discussion often refers to a video production system in which one or more live video streams are received via a wireless network to produce an output video stream for publication or other sharing. In this example, encoded video may be stored on a removable storage, such as a Secure Digital (SD) card, CompactFlash card, USB memory stick, disk drive or other non-volatile storage that could become accidentally disconnected. Equivalent embodiments could be implemented within video cameras, mobile phones, transcoding devices, computer systems or other devices to address any sort of interruptions (e.g., battery depletion, power interruptions, memory full, failure of wired or wireless data connectivity, accidental human interruptions, and or the like).

Similarly, the following discussion often focuses on MPEG4 video encoding for convenience, inasmuch as MPEG4 has been widely adopted for video distribution across a wide number of platforms, web services and applications. MPEG4 is described by the ISO/IEC 14496 standard of the ISO/IEC Moving Picture Experts Group, as updated from time to time. The concepts set forth herein are not limited to MPEG or MPEG4, however, and equivalent concepts could be applied to any number of different video encoding or compression standards, or to any of the different versions of those standards, including versions that are subsequently developed.

Turning now to the drawings and with initial reference to FIG. 1, an example media file 100 representing an encoded media stream suitably includes a header portion 120 and a data portion 130. Various embodiments may include additional portions, such as the synchronization portion 110 shown in FIG. 1 as desired. As noted above, the header portion 120 contains space that is initially reserved for subsequent writing of index data while the encoding process is ongoing. As encoded data 135 representing video frames and the like is created, this data 135 is stored in data portion 130 of the file as appropriate.

During the continued encoding of the video data 135, the previously-reserved header portion 120 can be used to store intermittent index data 125 describing the already-encoded data 135. Typically, the amount of index data 125 will increase with the amount of video data 135, so in practice the reserved header space 120 can be progressively filled with additional index data as the encoding continues. In the event of an interruption, the index data 125 previously stored in the header portion 120 can be used to playback the majority of the encoded content 135 stored in data portion 130, as desired.

In various embodiments, the data portion 130 of file 100 is essentially unlimited so that any amount of encoded content 135 could be created to represent any desired amount of video content. Other embodiments could impose a limit or cap on the data portion 130, if desired, thereby creating an unused reserve 137 of data portion 130 until encoded data 135 fills the data portion 130. Conversely, the reserved header portion 120 may begin to fill if the encoded data 135 results in a sufficiently large amount of index data 125. If insufficient space 127 remains in the header portion, then the file 100 may be finalized; that is, a final index 125 may be written to the header portion 120 and a new file 100 may be created for subsequent content, as described more fully below. The amount of space reserved for header portion 120 may vary between embodiments depending upon the amount of encoded content that is expected, as described more fully below.

Figure 2:
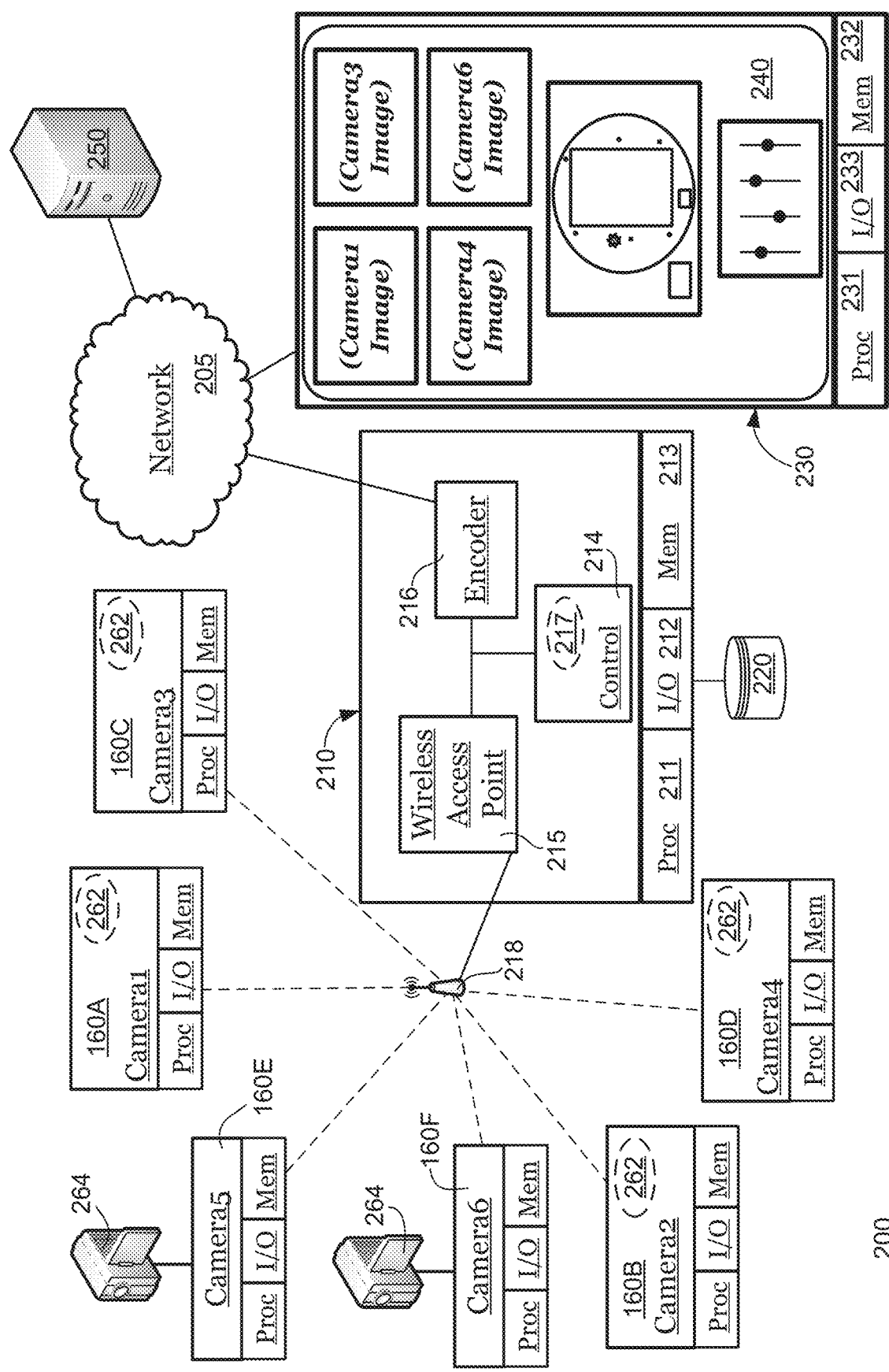
FIG. 2 is a diagram of an example system for encoding, producing and distributing live video content.

FIG. 2 shows an example of a video production system 200 that could be used to produce a video program based upon selected inputs from multiple input video feeds. In the illustrated example, system 200 suitably includes a video processing device 210 that selects and encodes a video program based upon instructions received from a control device 230. The encoded video program may be initially stored as a file (e.g., file 100 discussed above) on an external storage (e.g., a memory card, hard drive or other non-volatile storage) 220 for eventual uploading to a hosting or distribution service 250 operating on the Internet or another network 205.

Video production system 210 suitably includes processing hardware such as a microprocessor 211, memory 212 and input/output interfaces 213 (including a suitable USB or other interface to the external storage 220). The example illustrated in FIG. 2 shows video production system 210 including processing logic to implement an IEEE 802.11, 802.14 or other wireless access point 215 for communicating with any number of video capture devices 260A-F, which could include any number of mobile phones, tablets or similar devices executing a video capture application 262, as desired. Video capture devices 260 could also include one or more conventional video cameras 264 that interact with video production system 210 via an interface device that receives DVI or other video inputs and transmits the received video to the video production system 210 via a Wi-fi, Bluetooth or other wireless network, as appropriate. Other embodiments could facilitate communications with any other types of video capture devices in any other manner.

Video encoding system 210 also includes controller 214 and encoder 216, as appropriate. Controller 214 and/or encoder 216 may be implemented as software logic stored in memory 212 and executing on processor 211 in some embodiments. Controller 214 may be implemented as a control application executing on processor 211, for example, that includes logic 217 for implementing the various processes described herein. Other embodiments may implement the various functions and features using hardware, software and/or firmware logic executing on other components, as desired. Encoder 216, for example, may be implemented using a dedicated video encoder chip in some embodiments.

In various embodiments, video processing device 210 operates in response to user inputs supplied by control device 230. Control device 230 is any sort of computing device that includes conventional processor 231, memory 232 and input/output 233 features. Various embodiments could implement control device 230 as a tablet, laptop or other computer system, for example, or as a mobile phone or other computing device that executes a software application 240 for controlling the functions of system 200.

The example illustrated in FIG. 2 shows control application 240 having an interface that shows various video feeds received from image collection devices 260A-F and that lets the user select an appropriate feed to encode into the finished product. Application 240 may include other displays to control other behaviors or features of system 200, as desired. Typically, control device 230 interacts with video processing device 210 via a wireless network, although wired connections could be equivalently used.

In operation, then, a user acting as a video producer would use application 240 to view the various video feeds that are available from one or more capture devices 260A-F. The selected video feed is received from the capture device 260 by video processing device 210. The video processing device 210 suitably compresses or otherwise encodes the selected video in an appropriate format for eventual viewing or distribution. Some embodiments may provide sufficient internal memory 212 for device 240 to store the encoded video, but many embodiments will store most, if not all, of the encoded video on an external memory card, disk drive or other storage 220.

As noted above, system 200 may be vulnerable to data loss or corruption if the external storage 220 is disconnected or removed during encoding, if the power fails, and/or if other interruptions should occur. To prevent excessive data loss, various embodiments include logic 217 to create and store index data while the encoding is still ongoing, prior to completion and finalization of the file that represents the encoded media stream. To that end, logic 217 represents hardware, firmware and/or software logic stored in memory 210 or elsewhere that is executable by processing hardware within video processing device 210 to perform intermittent storage of index data during ongoing encoding of video data. Although logic 217 is shown in the control module 214 in the example of FIG. 2, equivalent embodiments could implement the encoding logic 217 as software or firmware executed by encoder 216, as desired.

Figure 3:
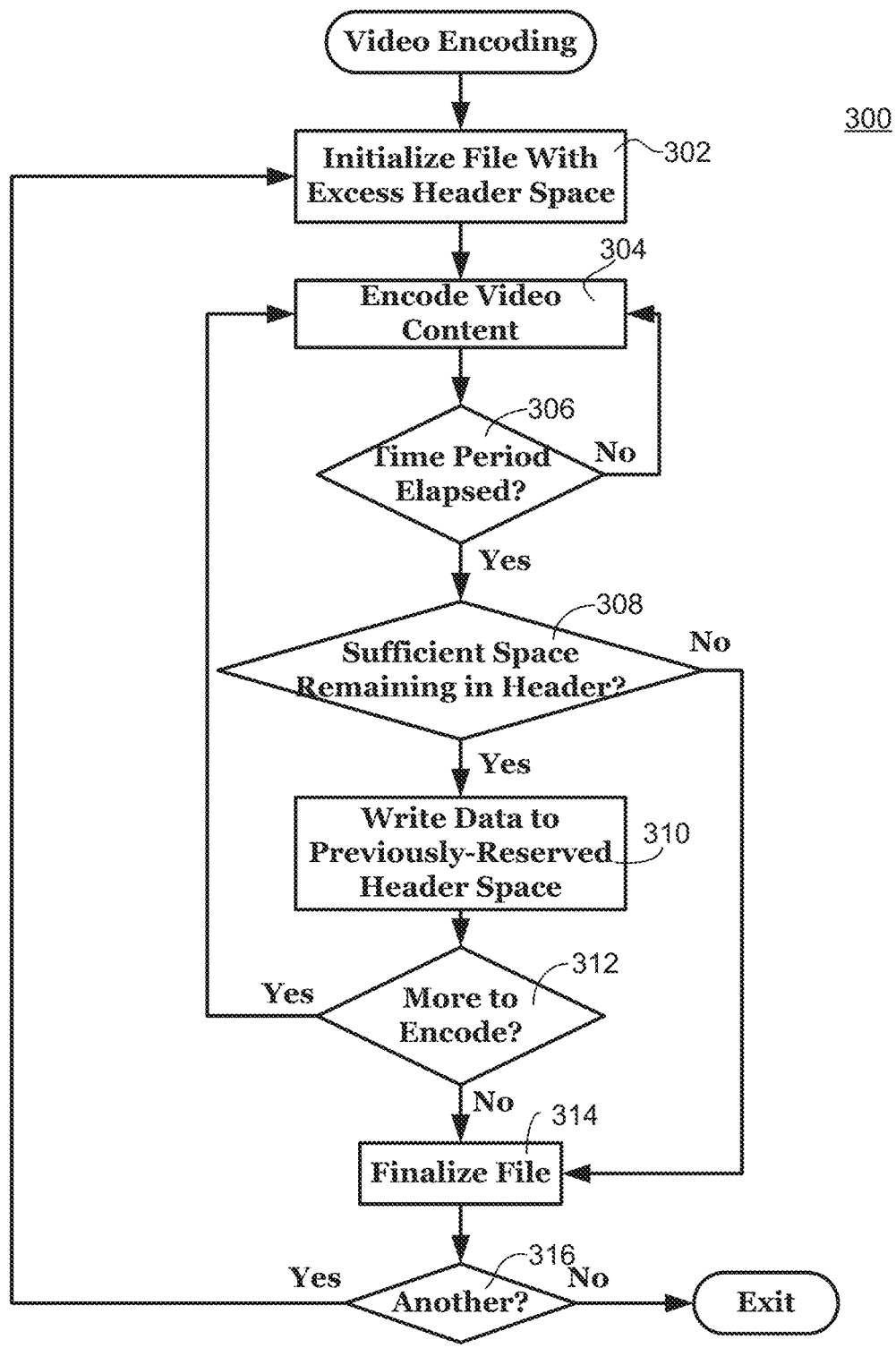
FIG. 3 is a flowchart of an example process executable by a video encoding system for improved fault tolerance in video encoding.

FIG. 3 shows an example process 30*o* that could be implemented using logic 217 or the like to perform ongoing creation and storage of header/index data during the video encoding process. As shown in FIG. 3, the video encoding process 300 suitably includes reserving header space 120 at the outset of encoding (function 302), writing index data 125 to the previously-reserved space 120 during the encoding process, and continuing to encode additional data (function 312) until the file is complete. If an interruption occurs during encoding, then, the previously-stored index data 125 can be used to recover and playback the encoded content even if the file is otherwise incomplete.

As noted above, any amount of space can be initially reserved (function 302) for the header index space 120. It will typically be desirable to reserve sufficient space to index all of the desired content, without reserving too much space so that portion 127 remains unused. Various embodiments may reserve header space 120 that is on the order of four megabytes or so, although other embodiments could use widely varying amounts of space as desired. In one embodiment, index data 125 occupies about one hundred kilobytes or so per minute of encoded video, so the amount of space 120 to be reserved can be adjusted based upon the expected length of the encoded video, as desired.

Video encoding occurs according to any standard, non-standard or other protocol (function 304). As noted above, various embodiments could encode the video file 100 substantially in accordance with MPEG4 or other standard encoding, but with the enhancements described herein. To that end, file 100 may be formatted as an MPEG container with any number of streams, each having any number of boxes or other fields. File 100 may be formatted so that the header space 120 is a "moov" box and/or the data space 130 is an "mdat" box, for example. Again, other embodiments could be equivalently implemented using any number of different protocols or formats, as desired.

Index creation occurs on any regular or irregular temporal basis (function 306). Generally speaking, the time period to store index data will vary from embodiment to embodiment according to design goals and the like. In practice, the non-contiguous read and write seeking needed to store the index on the writable media can take more time that the more contiguous writing of encoded data. Longer time periods will generate less processing overhead for the index data, but at the risk that any interruption could corrupt more data than would occur with a shorter time period. Depending upon the amount of processing resources available and the criticality of the encoded content, the time period may be shortened or extended as desired.

Index data therefore can be formatted and stored on any temporal basis, including any regular or irregular periodic basis (e.g., every minute, every ten minutes, or any other period as desired). Equivalent embodiments could additionally or alternately format and store index data in response to other non-temporal factors such as user inputs, interrupts received from other components of the video encoding system, or otherwise as desired.

If the initially-reserved portion 120 lacks sufficient space 127 to accommodate the entire then-current index data 125 (function 308), it may be desirable to simply finalize the file 100 (function 314) by writing a final index 125 into the available space 120. Subsequent video content can then be encoded into a new, separate file (function 316) as desired. Various embodiments may wish to retain at least some reserve space 127 in the header field 120 to prevent overwriting. If the size of the index data 125 exceeds an appropriate threshold amount, then, function 308 may prefer to finalize the file rather than risk running out of space 127. Other embodiments could be fashioned to re-organize the encoded file or to take other actions as desired, although these could be more computationally intense than a live-encoding system would typically prefer.

If sufficient space 127 remains in the pre-reserved header space 120, however, then the index data 125 may be stored within the available space (function 310) and encoding of additional video data 135 can continue normally (function 312). The indexes used during intermittent storage may be essentially identical to the indexes typically formatted during the finalization process, even if the ultimate length or duration of the file 100 is not yet known. Data fields in the index data 125 relating to the spatial or temporal length of the content file 100 may be left blank, if appropriate. If the fields are needed for playback, then substitute data relating to the then-current state of the file could be substituted for final data. That is, the then-current temporal and spatial dimensions of the file could be temporarily used until the next index is created, thereby leading the playback device into believing that the file is somewhat shorter than it really is, but nevertheless allowing playback up to the "end point" identified in the index data 125. Other embodiments may complete the index data 125 stored during encoding in any other manner, as appropriate.

In a typical MPEG4 embodiment, subsequently-compiled index data 125 will overwrite the previously stored data 125 in space 120, as appropriate. Other embodiments may support concatenation of index data 125 so that only the newly-determined index data 125 needs to be written during each write period, if desired.

When the encoding is complete (function 312), then the encoded file 100 may be finalized, as appropriate. Finalizing may include writing final index data 125 to the reserved header space, updating the final length of file 100 and/or data field 130, and completing other functions as desired. After finalization, the encoded file 100 may be relatively indistinguishable from any other file encoded according to the same protocols and formats. Any number of different files 100 may be processed to provide any number of eventual outputs for viewing, sharing and/or publication as desired (function 316).

Various embodiments may be modified or enhanced in any number of different ways. If additional reliability is desired, for example, some implementations could store a duplicate copy of the index data in internal memory 212 of video processing device 210. If an interruption were to occur while the device 210 was writing the index data 125 to the removable media 220, for example, the index data 125 could become corrupt or otherwise unreadable. Upon recovery from the interruption, however, the duplicate index data 125 could be transferred to the file 100 so that the encoded data 130 would once again become readable. Other embodiments could include any number of other enhancements, as desired.

As described herein, then, an encoded video file is made more tolerant to electrical, physical or other interruptions by initially reserving space in a header of the file, and then by periodically (or otherwise) storing index data into the reserved header space as the encoding continues. If an interruption were to occur, the encoded content would still be readable at least to the point that the last index was stored, thereby greatly reducing the amount of content that could be lost. As noted at the outset, these general concepts may be applicable to any number video encoding contexts, including but not limited to live video production.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process executed by a video encoder device to encode digital video content of unknown duration to a file, the automated process comprising:
    prior to encoding the digital video content of unknown duration, the video encoder device reserving an initial portion of the file as header space for storing header information about the encoded digital video content;
    encoding a portion of the digital video content of unknown duration by the video encoder device in real time as the digital video content is received by the video encoder device;
    prior to terminating encoding of the digital video content of unknown duration, the video encoder device storing the encoded portion of the digital video content in a data portion of the file that occurs after the header space, and also storing intermittent header information describing the encoded portion of the digital video content in the previously-reserved header space; and
    after storing the intermittent header information in the previously-reserved header space, the video encoder device determining whether sufficient space remains in the header space to accommodate additional header information, and continuing to encode the digital video content of unknown duration if sufficient space remains in the header space by repeating the encoding for a subsequent portion of the digital video content and the storing of intermittent header information for the subsequent portion of the digital video content by the video encoder device on a temporal basis until either the encoding of the digital video content of unknown duration is complete, or until the previously-reserved header space is filled, and, if the header space of the file contains insufficient space for further encoding, the video encoder device finalizing encoding of the digital video content and initiating encoding of a second file for a remainder of the digital video content, wherein the second file comprises a second header space that is reserved for subsequent storage of intermittent header information.

2. The automated process of claim 1 wherein the video encoder device terminates the encoding when the previously-reserved header space is filled, even though additional content remains to be encoded for the digital video content of unknown duration.

3. The automated process of claim 1 wherein the video encoder device repeats the encoding and storing of intermittent header information for subsequent portions of the digital video content on a regular temporal basis.

4. The automated process of claim 1 further comprising the video encoder device recovering the file after an interruption that occurred before the encoding of the digital video content of unknown duration is complete by reading the intermittent header information that was last stored in the header space prior to the interruption and continuing the encoding from the portion of the digital video content corresponding to the last stored intermittent header information.

5. The automated process of claim 1 further comprising the video encoder determining whether sufficient space remains in the header space to accommodate additional header information during encoding of the digital video content of unknown duration, wherein the video encoder device continues to encode the digital video content if sufficient space remains in the header space, and otherwise finalizes encoding of the file.

6. The automated process of claim 5 wherein the video encoder device subsequently continues encoding of the digital video content of unknown duration by initiating a second file for a remainder of the digital video content if the header space of the file contains insufficient space for further encoding.

7. The automated process of claim 1 wherein the header space follows a synchronization portion of the file.

8. The automated process of claim 1 wherein the file is formatted as an MPEG container, wherein the header space is formatted as a moovbox and wherein the data portion is formatted as an mdat box.

9. A video encoder device comprising a processor and a memory, wherein the memory stores instructions that are executable by the processor to perform an automated process that encodes digital video content of unknown duration to a file, wherein the automated process comprises:
  initially reserving a portion of the file as header space for storing header information about the encoded digital video content of unknown duration prior to encoding the digital video content;
  encoding a portion of the digital video content in real time as the digital video content is received by the video encoder device;
  after a predetermined time of encoding the portion of the digital video content prior to concluding the encoding of the digital video content, storing the encoded portion of the digital video content in a data portion of the file that occurs after the header space, and also storing intermittent header information describing the encoded portion of the digital video content in the previously-reserved header space; and
  after storing the intermittent header information in the previously-reserved header space, determining whether sufficient space remains in the header space to accommodate additional header information, and continuing to encode the digital video content to the file if sufficient space remains in the header space by repeating the encoding and the storing of intermittent header information on a temporal basis until either the encoding of the digital video content is complete, or until the previously-reserved header space is filled, and, if the header space of the file contains insufficient space for further encoding, the video encoder device finalizing encoding of the digital video content and initiating encoding of a second file for a remainder of the digital video content, wherein the second file comprises a second header space that is reserved for subsequent storage of intermittent header information.

10. The video encoder device of claim 9 wherein the automated process further comprises recovering the file after an interruption that occurred before the encoding of the digital video content is complete by reading the intermittent header information that was last stored in the header space prior to the interruption.

11. The video encoder device of claim 9 wherein the file is formatted as an MPEG container, wherein the header space is formatted as a moov box and wherein the data portion is formatted as an mdat box.

12. The video encoder device of claim 9 wherein the encoding of the file continues while the intermittent header information is stored so that if an interruption occurs before the file is completely encoded, the portion of the file that has been encoded can be recovered from the intermittent header information that was last stored.

13. The video encoder device of claim 9 wherein each intermittent header information overwrites a prior intermittent header information that was previously stored in the header space of the file.

14. The automated process of claim 1 wherein the encoding of the file continues while the intermittent header information is stored so that if an interruption occurs before the file is completely encoded, the portion of the file that has been encoded can be recovered from the intermittent header information that was last stored.

15. The automated process of claim 1 wherein each intermittent header information overwrites a prior intermittent header information that was previously stored in the header space of the file.

16. A video encoder device comprising a processor and a memory, wherein the memory stores instructions that are executable by the processor to perform an automated process that encodes digital video content of unknown duration to plurality of files, wherein the automated process comprises:
  initially reserving a portion of a first file as header space for storing header information about the encoded digital video content prior to encoding the digital video content, wherein each of the plurality of files is formatted as an MPEG container, wherein the header space is formatted as a moov box and wherein the data portion is formatted as an mdat box;
  encoding a portion of the digital video content of unknown duration for a predetermined period of time in real time as the digital video content is received by the video encoder device;
  after the predetermined period of time and prior to concluding the encoding of the digital video content, storing the encoded portion of the digital video content in a data portion of the first file that occurs after the header space, and also storing intermittent header information describing the encoded portion of the digital video content in the previously-reserved header space; and
  after storing the intermittent header information in the previously-reserved header space, determining whether sufficient space remains in the header space to accommodate additional header information, and continuing to encode the digital video content of unknown duration for another predetermined period of time if sufficient space remains in the header space, and otherwise finalizing encoding of the first file;
  wherein the video encoder device subsequently initiates encoding of a second one of the plurality of files for a remainder of the digital video content if the header space of the first file contains insufficient space for further encoding, and wherein the second file comprises a second header space that is reserved for subsequent storage of intermittent header information describing subsequent portions of the digital video content of unknown duration.

17. The video encoder device of claim 16 wherein the encoding of the file continues while the intermittent header information is stored so that if an interruption occurs during the next predetermined period of time, the portion of the file that has been encoded can be recovered from the intermittent header information that was last stored.

* * * * *